US005824416A

United States Patent [19]

Chen et al.

[11] Patent Number: 5,824,416

[45] **Date of Patent: *Oct. 20, 1998**

[54] FUSER MEMBER HAVING FLUOROELASTOMER LAYER

[75] Inventors: Jiann Hsing Chen; Muhammad Aslam, both of Rochester; William Joseph Staudenmayer, Pittsford, all of N.Y.

[73] Assignee: Eastman Kodak Company, Rochester, N.Y.

[ * ] Notice: The term of this patent shall not extend beyond the expiration date of Pat. No. 5,780,545.

[21] Appl. No.: 612,698

[22] Filed: Mar. 8, 1996

[51] Int. Cl.[6] .......................... B32B 25/00; B32B 25/04; B32B 25/14

[52] U.S. Cl. .......................... 428/422; 428/421; 428/447

[58] Field of Search .................................... 428/421, 422, 428/446, 447, 451; 106/287.1, 287.19; 524/261, 267; 525/100, 101, 102; 492/49, 53, 56, 59; 355/284

[56] References Cited

U.S. PATENT DOCUMENTS

| | | | |
|---|---|---|---|
| 3,541,171 | 11/1970 | Starnes et al. | 260/666.5 |
| 3,644,482 | 2/1972 | Dexter et al. | 260/473 R |
| 3,714,268 | 1/1973 | Kaminaka et al. | 260/624 R |
| 4,029,827 | 6/1977 | Imperial et al. | 427/22 |
| 4,185,140 | 1/1980 | Strella et al. | 428/418 |
| 4,251,277 | 2/1981 | Martin | 106/38.22 |
| 4,257,699 | 3/1981 | Lentz | 355/3 FU |
| 4,264,181 | 4/1981 | Lentz et al. | 355/3 FU |
| 4,272,179 | 6/1981 | Seanor | 355/3 FU |
| 4,568,275 | 2/1986 | Sakurai | 432/60 |
| 4,845,003 | 7/1989 | Kiriu et al. | 430/110 |
| 5,035,950 | 7/1991 | Del Rosario | 428/421 |
| 5,081,280 | 1/1992 | Takee et al. | 560/75 |
| 5,269,740 | 12/1993 | Fitzgerald et al. | 492/56 |
| 5,281,506 | 1/1994 | Badesha et al. | 430/124 |
| 5,292,562 | 3/1994 | Fitzgerald et al. | 428/35.8 |
| 5,292,606 | 3/1994 | Fitzgerald | 428/35.8 |
| 5,395,725 | 3/1995 | Bluett et al. | 430/124 |
| 5,464,698 | 11/1995 | Chen et al. | 428/421 |
| 5,464,703 | 11/1995 | Ferrar et al. | 428/421 |
| 5,480,725 | 1/1996 | Fitzgerald et al. | 428/447 |
| 5,493,376 | 2/1996 | Heeks | 355/284 |

FOREIGN PATENT DOCUMENTS

| | | |
|---|---|---|
| 0 314 786 A1 | 5/1989 | European Pat. Off. . |
| 0 441 645 A2 | 8/1991 | European Pat. Off. . |

OTHER PUBLICATIONS

McGrath et al, ACS Symposium Series 286, p. 147 1985.

Kirk–Othmer, Encyclopedia of Chemical Technology, 3rd Ed., vol. 20, pp. 912–962 1987.

Silicone Compounds Register & Review Petrarch System, 1987, pp. 266–268.

*Primary Examiner*—Vivian Chen
*Attorney, Agent, or Firm*—Doreen M. Wells

[57] ABSTRACT

A fuser member is provided comprising a support; a fluoroelastomer layer on said support comprising a fluoroelastomer consisting essentially of from 42 to 58 mole percent vinylidene fluoride, 26 to 44 mole percent tetrafluoroethylene, and 5 to 22 mole percent hexafluoropropylene.

2 Claims, No Drawings

FUSER MEMBER HAVING FLUOROELASTOMER LAYER

FIELD OF THE INVENTION

This invention relates to a fuser member useful for heat-fixing a heat-softenable toner material to a receiver. More particularly, this invention relates to a fuser member having a fluoroelastomer layer.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of a receiver, such as, paper or a transparent film, where it is then fixed in place to yield the final desired toner image. The usual method of fixing the heat-softenable toners comprising, e.g., thermoplastic polymeric binders to the receiver involves applying heat to the toner once it is on the receiver surface to soften it and then allowing or causing the toner to cool.

One well-known fusing method comprises passing the toner-bearing receiver through a nip formed by a pair of opposing rollers, at least one of which (usually referred to as a fuser roller) is heated and contacts the toner-bearing surface of the receiver in order to heat and soften the toner. The other roller (usually referred to as a pressure roller) serves to press the receiver sheet into contact with the fuser roller.

It is a constant challenge to design a fuser roller and a fuser system which provides for improved release of the heated toner and toner-bearing receiver from the fuser roller, and for the extended life of the fuser roller materials. It is known to use a thin coating of release agents, typically functionalized or non-functionalized polysiloxane fluids, on fuser rollers to improve the release of the toner from the fuser roller. Also, the use of different types of coating materials on the fuser roller or pressure roller has been disclosed. For example, fluorocarbon resins like polytetrafluoroethylene (PTFE) or a copolymer of PTFE and perfluoroalkylvinylether, or fluorinated ethylenepropylene have been disclosed, because they have excellent release characteristics due to very low surface energies. Fluorocarbon resins also possess high temperature resistance, and excellent chemical resistance; however, they are not sufficiently flexible to provide for maximum toner contact. Polyfluorocarbon elastomers (fluoroelastomers), such as vinylene fluoride-hexafluoropropylene copolymers have been disclosed, because they are tough, flexible elastomers that have excellent high temperature resistance; however, they have relatively high surface energies, which compromise toner release. Polyfluorocarbon elastomers also provide poor thermal conductivity. Polysiloxane elastomers, for example poly(dimethylsiloxane) elastomer (PDMS), have been disclosed, because they are flexible and elastic; however, they degrade after a relatively short time due to wear and absorption of release oil. Fuser rollers having multiple layers of these various materials with and without fillers or other addenda, as well as fuser rollers having mixtures of these materials in a single layer, have been previously disclosed. Several examples of the large number of patents disclosing the various fuser roller materials follow.

U.S. Pat. Nos. 4,264,181; 4,257,699 and 4,272,179 disclose silicone elastomer and fluoroelastomer coatings for fuser rollers having a metal filler dispersed therein. The metal filler must be present in the outer layer in an amount sufficient to interact with a mercapto-functionalized silicone release oil which is applied to the elastomer layer to provide for release of toner from the fuser roller.

U.S. Pat. No. 5,035,950 discloses a copolymer of vinylidene fluoride and at least 23.4 mole % hexafluoropropylene having a fluorine content of 69–71% as useful for fuser member coatings.

U.S. Pat. No. 4,568,275 discloses a fuser roller coating consisting of a mixture of a fluoroelastomer and a fluoropolymer resin, and a second fuser roller coating consisting of a silicone rubber.

U.S. application Ser. No. 08/122,754 filed Sep. 16, 1993, as a continuation in part of U.S. application Ser. No. 07/940,582, filed Sep. 4, 1992, and U.S. application Ser. No. 08/250,325, filed May 27, 1994, as a continuation in part of U.S. application Ser. No. 07/940,929, filed Sep. 4, 1992 disclose the use of fluoroelastomeric copolymers and terpolymers in an interpenetrating network comprising a network of separately crosslinked silicone polymer and fluoroelastomer.

U.S. application Ser. No. 08/399,067 discloses the use of fluoroelastomeric copolymers and terpolymers in a roller coating composition comprising a fluoroelastomer and and fluorinated resin.

SUMMARY OF THE INVENTION

This invention provides a fuser member comprising:

a support;

a fluoroelastomer layer on said support comprising a cured fluorocarbon random copolymer comprising subunits with the following general structures:

$$-(CH_2CF_2)_x-$$

(vinylidene fluoride subunit (“VF”)), $$-(CF_2CF_2)_y-$$

(tetrafluoroethylene subunit (“TFE”)), and $$-(CF_2\overset{\displaystyle CF_3\atop|}{C}F)_z- \quad \text{(hexafluoropropylene subunit (“HFP”))},$$

wherein x has a subunit mole percentage of from 42 to 58 mole percent, y has a subunit mole percentage of from 26 to 44 mole percent, and z has a subunit mole percentage of from 5 to 22 mole percent.

This invention also provides a fuser member comprising:

a fluoroelastomer layer on said support comprising a fluoroelastomer consisting essentially of from 42 to 58 mole percent vinylidene fluoride, 26 to 44 mole percent tetrafluoroethylene, and 5 to 22 mole percent hexafluoropropylene.

Additionally, this invention provides a fuser member comprising:

a support;

a fluoroelastomer layer comprising a fluoroelastomer consisting essentially of from 42 to 58 mole percent vinylidene fluoride, 26 to 44 mole percent tetrafluoroethylene, and 5 to 22 mole percent hexafluoropropylene;

and release agent on said fluoroelastomer layer; said release agent comprising a mercapto-functionalized poly(organosiloxane) fluid.

Further, this invention provides a fuser member comprising:

a support;

a fluoroelastomer layer comprising a fluoroelastomer consisting essentially of from 42 to 58 mole percent vinylidene fluoride, 26 to 44 mole percent tetrafluoroethylene, and 5 to 22 mole percent hexafluoropropylene;

and release agent on said fluoroelastomer layer, said release agent comprising a mercapto-functionalized poly(organosiloxane) fluid, a poly(alkylene oxide)-functionalized poly(organosiloxane) fluid, and an antioxidant.

DESCRIPTION OF THE INVENTION

This invention is directed to fuser members. The term "fuser member" is used herein to refer to components of an electrophotographic fusing system that engage a toner carrying receiver and fuse the toner by means of elevated temperature and pressure. Examples of such components include fuser and pressure rollers, fuser and pressure plates, and fuser belts. The term fuser member is also used herein to refer to similar components, subject to similar conditions used in non-electrophotographic equipment.

The fuser members of this invention are preferably fuser rollers or pressure rollers. The fuser members comprise a coated material comprising a fluoroelastomer comprising vinylidene fluoride, tetrafluoroethylene, hexafluoropropylene monomers on a support The support can comprise metal, ceramic, or polymeric material, such as thermoset resins with or without fiber enforcement, and can have a suitable shape for the desired fuser member shape. For example, in the preferred embodiment the support has a cylindrical shape, and is referred to as a core, to make a fuser or pressure roller. The preferred core consists of metal, such as aluminum, nickel, or steel, most preferably aluminum. The support can also comprise adhesion promoters, primers or additional layers, such as, base cushion layers.

In one preferred embodiment of the invention, the support comprises a metal element coated with an adhesion promoter layer. The adhesion promoter layer can be any commercially available material known to promote the adhesion between fluoroelastomers and metal, such as silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Preferred adhesion promoters are epoxy-functionalized silane coupling agents. The most preferable adhesion promoter is a dispersion of Thixon™300, Thixon™311 and triphenylamine in methyl ethyl ketone. The Thixon™ materials are supplied by Morton Chemical Co.

In another preferred embodiment of the invention, the support comprises a metal element with one or more base cushion layers. The base cushion layer or layers can consist of known materials for fuser member layers such as, one or more layers of silicone rubbers, fluorosilicone rubbers, or additional fluoroelastomer layers. Preferred silicone rubber base cushion layers comprise polymethyl siloxanes, such as EC-4952, sold by Emerson Cummings, and Silastic™ J or E sold by Dow Coming. Preferred fluorosilicone rubber base cushion layers include polymethyltrifluoropropylsiloxanes, such as Sylon™, and Fluorosilicone FX11293 and FX11299 sold by 3M. Preferred fluoroelastomer base cushion layers comprise copolymers of vinylidene fluoride and hexafluoropropylene marketed by E.I. duPont de Nemours and Company under the designation "Viton™ A" and marketed by Minnesota Mining and Manufacturing under the designation "Fluorel™ FX-2530", and terpolymers of vinylidene fluoride, hexafluoropropylene and tetrafluoroethylene sold by E.I. duPont de Nemours and Company under the designation "Viton™ B". Other suitable fluoroelastomers are disclosed in U.S. Pat. No. 5,035,950, incorporated herein by reference. An interpenetrating network comprising separately crosslinked silicone polymer and fluoroelastomer can be used as the base cushion layer. Interpenetrating networks are disclosed in U.S. application Ser. No. 08/122,754 filed Sep. 16, 1993, as a continuation in part of U.S. application Ser. No. 07/940,582, filed Sep. 4, 1992, and U.S. application Ser. No. 08/250,325, filed May 27, 1994, as a continuation in part of U.S. application Ser. No. 07/940,929, filed Sep. 4, 1992, incorporated herein by reference.

The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick.

Inert fillers may be added to any of the described polymeric base cushion layer compositions to provide added strength, and thermal conductivity. Examples of useful fillers include particulate filler or pigments comprising for example metals, such as tin, zinc, metal oxides, such as, aluminum oxide, and tin oxide, metal hydroxides, such as calcium hydroxide, and mineral oxides, such as, silicate and minerals, such as, silica, and carbon of various grades or combinations of the fillers. The filler can be present in the base cushion layer from about 0 to about 50 percent ot the total volume of the layer. In preferred embodiments of the invention, the base cushion is resistant to cyclic stress induced deformation and hardening. Examples of suitable materials are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,480,725 (tin oxide filler), U.S. Pat. No. 5,464,698 (tin oxide). Additional suitable base cushions are disclosed in U.S. patent application Ser. No. 08/268,136, entitled "Zinc Oxide Filled Diphenylsiloxane-Dimethylsiloxane Fuser Memeber for Fixing Toner to a Substrate", filed Jun. 29, 1994, by John J. Fitzgerald et al; U.S. patent application Ser. No. 08/268,141, entitled "Tin Oxide Filled Diphenylsiloxane-Dimethylsiloxane Fuser Member for Fixing Toner to a Substrate", filed Jun. 29, 1994, by John J. Fitzgerald et al; U.S. Pat. No. 5,464,703 (tin oxide). The patents mentioned in this paragraph are hereby incorporated herein by reference.

Other addenda can also be added such as pigments. When present, the fillers and other possible addenda are typically present in an amount of between about 3 and 60 percent by volume based on the total weight of the composite.

The base cushion layer may be adhered to the metal element via a base cushion primer layer. The base cushion primer layer can comprise a primer composition which improves adhesion between the metal element and the material used for the base cushion layer. If the base cushion layer is a fluoroelastomer material, the adhesion promoters described above can be used as the base cushion primer layer. Other primers for the application of fluorosilicone rubbers and silicone rubbers to the metal element are known in the art. Such primer materials include silane coupling agents, which can be either epoxy-functionalized or amine-functionalized, epoxy resins, benzoguanamineformaldehyde resin crosslinker, epoxy cresol novolac, dianilinosulfone crosslinker, polyphenylene sulfide polyether sulfone, polyamide, polyimide and polyamide-imide. Examples of commercially available primers include DC-1200 marketed by Dow Corning, and GE-4044 marketed by General Electric.

Further, the base cushion layer can be electrically treated, for example, by corona discharge treatment (CDT) prior to the application of the fluoroelastomer layer.

The inclusion of a base cushion layer on the metal element of the support increases the compliancy of the fuser member. By varying the compliancy, optimum fuser members and fuser systems can be produced. The variations in the compliancy provided by optional base cushion layers are in addition to the variations provided by just changing the thickness or materials used to make the fluoroelastomer top coat layer. The presently preferred embodiment in a fuser roller system is to have a very compliant fuser roller and a non-compliant or less compliant pressure roller. In a fuser belt system it is preferred to have a compliant pressure roller and a non-compliant or less compliant belt. Although the above are the presently preferred embodiments, fuser systems and members including plates, belts and rollers can be made in various configurations and embodiments wherein at least one fuser member is made according to this invention.

The fluoroelastomer layer comprises a cured fluorocarbon random copolymer comprising subunits with the following general structures:

$$-(CH_2CF_2)_x-$$

(vinylidene fluoride subunit ("VF")), $$-(CF_2CF_2)_y-$$

(tetrafluoroethylene subunit ("TFE")), and

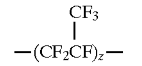 (hexafluoropropylene subunit ("HFP")).

In these formulas, x, y, and z are mole percentages of the individual subunits relative to a total of the three subunits (x+y+z), referred to herein as "subunit mole percentages". (The curing agent can be considered to provide an additional "cure-site subunit", however, the contribution of these cure-site subunits is not considered in subunit mole percentages.) In the fluorocarbon copolymer, x has a subunit mole percentage of from 42 to 58 mole percent, y has a subunit mole percentage of from 26 to 44 mole percent, and z has a subunit mole percentage of from 5 to 22 mole percent.

In a currently preferred embodiment of the invention, subunit mole percentages are: x is from 47 to 56, y is from 21 to 39, and z is from 10 to 22; or more preferably x is from 50 to 55, y is from 25 to 35, and z is 13 to 22. In the most preferred embodiments of the invention, x, y, and z are selected such that fluorine atoms represent between 69 and 74, more preferably 70 to 72 percent of the total formula weight of the VF, HFP, and TFE subunits. It is presently preferred that the fluorocarbon polymer is a terpolymer of VF, HFP, and TFE subunits. It is preferred that the weight ratio of vinylidene fluoride to hexafluoropropylene in the terpolymer is from 1.06 to 1.6.

To form the fluoroelastomer layer, the uncured fluorocarbon polymer, crosslinking agent, and any other additives, such as an accelerator, and acid acceptor type filler, are mixed to form a composite then the composite can be applied over the support with or without a base cushion layer and cured. The crosslinking agent can be a basic nucleophile. Basic nucleophilic cure systems are well known and are discussed, for example, in U.S. Pat. No. 4,272,179, incorporated herein by reference. One example of such a cure system combines a bisphenol as the crosslinking agent and an organophosphonium salt, as an accelerator. Examples of bisphenol include 2,2-bis(4-hydroxyphenyl) hexafluoropropane, and 4,4-isopropylidenediphenol:

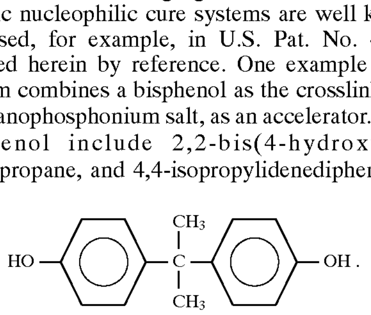

Examples of organophosphonium salts include halides such as benzyl triphenylphosphine chloride:

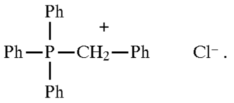

The crosslinking agent is incorporated into the polymer as a cure-site subunit, for example, bisphenolic residues. Other examples of nucleophilic addition cure systems are sold commercially as DIAK™ No. 1 (hexamethylenediamine carbamate and DIAK™ No. 3 (N,N'-dicinnamylidene-1,6-hexanediamine) by E.I. duPont de Nemours & Co. Nucleophilic addition-cure systems used in conjunction with fluorocarbon polymers can generate hydrogen fluoride and thus acid acceptors are added as fillers. Suitable acid acceptors include Lewis acids such as metal oxides or hydroxides, for example, magnesium oxide, calcium hydroxide, lead oxide, copper oxide and the like. In the preferred embodiment, 3 parts MgO and 6 parts $Ca(OH)_2$ per 100 parts of fluoroelastomer are used as acid acceptors in the fluoroelastomer layer composition.

Other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate; however, the nucleophilic addition system is preferred.

Curing of the fluoroelastomer layer is carried out according to the well known conditions for curing fluoroelastomers ranging, for example, from about 12–48 hours at temperatures of between 50° C. to 250° C. Preferably the coated fluoroelastomer layer is dried until solvent free at room temperature, then gradually heated to about 230° C. over 24 hours, then maintained at that temperature for 24 hours.

The fuser members of the invention can be coated with the fluoroelastomer composite by conventional techniques. Solvent transfer coating techniques are preferred. Coating solvents which can be used include polar solvents, for example, ketones, acetates and the like. Preferred solvents for the fluoroelastomer composites are the ketones, especially methyl ethyl ketone (MEK) and methyl isobutyl ketone. The preferred solvent is a blend of MEK and methanol, most preferably 85:15 by weight MEK:methanol. The composites are dispersed in the coating solvent at a concentration of between about 10 to 50 weight percent, preferably between about 20 to 30 weight percent and coated on the fuser member to a thickness of 0.025 to 0.25 mm on drying. The coated article is cured under the conditions described above.

Other coating methods include ring coating, dip coating and disk coating using the same solvents mentioned above. Ring coating an overcoat layer is currently preferred. In ring coating, a ring or gasket of the proper diameter is provided. The roll is brought up through the ring and coating material is provided on the top of the ring or gasket. As the roll passes, coating composition is taken up by the roll. The thickness is determined by the viscosity of the coating composition, by the speed at which the roll is drawn up through the ring and by other factors known in the art.

The thickness of the fluoroelastomer layer is preferably 0.025 to 0.25 mm if a base cushion layer is present, and 0.25 to 5 mm if applied to the support without the presence of a base cushion layer.

The fluroelastomer top coat layer may include particulate filler or pigments to provide added strength or increased thermal conductivity. Examples of suitable fillers were listed above for the base cushion layer. The particulate filler, if present, preferably has a total concentration in the outer layer of from about 25 to 50 percent of the total volume of the layer. Aluminum oxide is the presently preferred filler, however, the presently preferred embodiment does not have filler incorporated into the fluoroelastomer layer.

The molecular weight of the uncured fluoroelastomer is largely a matter of convenience, however, an excessively large or excessively small molecular weight would create problems, the nature of which are well known to those skilled in the art. In a preferred embodiment of the invention the uncured fluoroelastomer has a number average molecular weight in the range of about 10,000 to 200,000.

Suitable uncured fluoroelastomers useful in this invention are available commercially. The preferred fluorocarbon polymers are vinylidene fluoride-co-hexafluoropropylene-co-tetrafluoroethylene available under the trade name Fluorel™ FX-9038 from Minnesota Mining and Manufacturing where x is 52, y is 34, and z is 14, and vinylidene fluoride-co-hexafluoropropylene-co-tetrafluoroethylene available under the trade name FE-5840Q from Minnesota Mining and Manufacturing where x is 53 ,y is 26, and z is 21.

A release agent can be applied to the outermost surface of the fuser member during use to aid the fuser member in releasing from the toner it contacts during the fusing operation. Because of the release characteristics of this fluoroelastomer layer as little as 1.0 mg/copy (the copy is 8.5 by 11 inch, 20 pound bond paper) can provide release of the fuser member from the toner.

Release agents useful on the fuser member of this invention can comprise poly(organosiloxane) fluid, which can be functionalized and can be a polymer of the same repeating monomer or can be a copolymer of two or more different repeating monomers, both referred to as "polymers". The polymers can be random or block copolymers. Functional groups, if present, can be terminal groups (also referred to as endcaps) or the functional groups can be located on a side chain off the silicone backbone. The poly(organosiloxane) fluids can be poly(alkylsiloxane), poly(arylsiloxane), poly(alkylarylsiloxane), poly(alkyl(aryl)siloxane), or any of the poly(siloxanes) just listed having functional groups. Such functionalized poly(siloxanes) include epoxy-functionalized, carboxyl-functionalized, polyether-functionalized, phenol-functionalized, ainino-functionalized, alkoxy-functionalized, methacryl-functionalized, carbinol-functionalized, hydroxy-functionalized, vinyl-functionalized, acrylic-functionalized, silane-functionalized, trifluoro-functionalized, or mercapto-functionalized poly(organosiloxanes). The poly(organosiloxane) fluids useful in this invention can be prepared as described in numerous patents and publications. One method is by the catalyzed ring opening of octamethylcyclotetrasiloxane as described in for example, McGrath, et al, ACS Symposium Series 286, page 147, incorporated herein by reference. Other references which disclose the preparation of these fluids are Kirk-Othmer, *Encyclopedia of Chemical Technology,* 3rd Ed., Vol. 20, pp. 912–962 and U.S. Pat. No. 4,251,277 and 4,845,003, incorporated herein by reference. Many of the poly(organosiloxane) fluids useful in this invention are commercially available from, for example, General Electric, Dow Corning, and Petrarch.

The preferred release agents comprise poly(organosiloxane) polymers and random or block copolymers having the following structural formula:

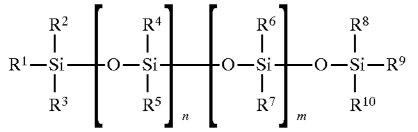

I where $R^1$ to $R^{10}$ are independently hydrogen, alkyl having from 1 to 18 carbons, such as methyl, ethyl, propyl, butyl and the like; an aryl group having from 6 to 18 carbons, such as phenyl, benzyl, napthyl, and the like; a mercaptoalkyl group having from 1 to 18 carbons, such as mercaptopropyl; an aminoalkyl group having from 1 to 10 carbons, such as aminopropyl or aminoisopropyl; trifluoroalkyl having 1 to 18 carbons, such as trifluoromethyl; or trifluoroaryl having 6 to 18 carbons, such as trifluoromethylphenyl, where n is preferably a number from 0 to 300, more preferably n is 50 to 200, and m is preferably a number from 1 to 300, more preferably m is 1 to 200. The viscosity of the poly(organosiloxane) fluids is preferably from 1 to 100,000 centistoke (ctsk), more preferably 50 to 60,000 ctsk at 25° C. The preferred weight average molecular weight range for the poly(organosiloxane) polymers is 200 to 140,000, more preferably 4,000 to 120,000.

The more preferred release agents comprise poly(dimethylsiloxane), poly(diphenylsiloxane), poly(methylphenylsiloxane), poly(dimethyldiphenylsiloxane), mercaptopropyl-functionalized poly(dimethylsiloxane), aminopropyl-functionalized poly(dimethylsiloxane), carboxypropyl-functionalized poly(dimethylsiloxane), silane-functionalized poly(dimethylsiloxane), and trifluoropropyl-functionalized poly(dimethylsiloxane).

The most preferred release agents comprise mercapto-functionalized trimethyl-terminated poly(dimethylsiloxane) (PDMS), that is, where $R^1$ to $R^{10}$ in Structure I are methyl and n+m is approximately 4 to 3,000, and trimethylsilyl-terminated poly(dimethyldiphenylsiloxane) where $R^1$ to $R^5$ and $R^8$ to $R^{10}$ in structure I are methyl and $R^6$ and $R^7$ are phenyl, and n+m is approximately 4 to 3,000. Specific examples of useful mercapto-functionalized poly(organosiloxane) fluids include those disclosed in U.S. Pat. Nos. 4,029,827; 4,185,140; 5,281,506 and 5,395,725, incorporated herein by reference. Commercially available fluids include 1065-8200, 8700-V/9210, 9500/9700-V and 9900, produced by Xerox.

The preferred release agent comprises a non-poly(alkylene oxide)-functionalized poly(organosiloxane) fluid, and poly(alkylene oxide)-functionalized poly(organosiloxane) fluid. The non-poly(alkylene oxide)-functionalized poly(organosiloxane) fluid comprises one or a mixture of the poly(organosiloxane) fluids described above, most preferably a mercapto-functionalized poly(organosiloxane). Useful poly(alkylene oxide)-functionalized fluids useful in the release agent are preferably poly(alkylsiloxane), poly(arylsiloxane) and poly (alkylarylsiloxane) fluids with at least one poly(alkylene oxide) group substituted on one or both ends of the siloxane backbone or on a side chain off the siloxane chain or any combination of locations. Each poly(alkylene oxide) group can have 1 to 200 alkylene oxides, preferably 10 to 120 alkylene oxides most preferably 50 to 100 alkylene oxides bonded to each other. Examples of poly(alkylene oxide)-functionalized poly(organosiloxane) fluids include poly (alkylene oxide)-functionalized poly(dimethylsiloxane), poly(dimethyldiphenylsiloxane), or poly (methyloctylsiloxane), the most preferred being poly (alkylene oxide)-functionalized poly(dimethylsiloxane). The preferred poly(alkylene oxide)-functionalized polysiloxanes have the following structure:

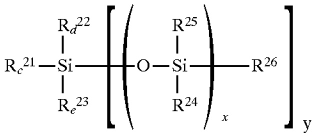

where $R^{21}$, $R^{22}$, $R^{23}$, $R^{24}$, and $R^{25}$ are independently alkyl, aryl, or alkylaryl having 1 to 18 carbons, preferably alkyl having 1 to 4 carbons, most preferably methyl, x is 7 to 100 and y is 1 to 3, and c, d and e are 0 or 1, and $R^{26}$ is a poly(alkylene oxide) group having one of the following structures:

$—(OR^{28})_a(OR^{29})_bOR^{27}$, or

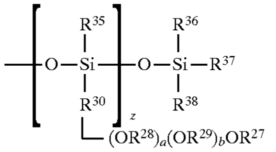

where $R^{28}$, $R^{29}$ and $R^{30}$ are independently alkylene groups having from 0 to 20 carbons, a is from 1 to 200, b is from 1 to 200, $R^{35}$, $R^{36}$, $R^{37}$ and $R^{38}$ are independently alkyl, aryl or alkylaryl having 1 to 18 carbons, preferably alkyl having 1 to 4 carbons, most preferably methyl, and $R^{27}$ is an alkyl having 1 to 20 carbons or hydrogen and z is 1 to 5, more preferably 1 to 3. It is preferred that $R^{28}$, $R^{29}$ and $R^{30}$ are alkylene groups having 1 to 5 carbons, and $R^{27}$ is hydrogen or methyl. Most preferably $R^{29}$ and $R^{30}$ are propylene and $R^{28}$ is ethylene, a is 20 to 70 and b is 10 to 40.

The preferred viscosity for the poly(alkylene oxide)-functionalized polysiloxane is 2 to 10,000 ctsk at 25° C., and the preferred weight average molecular weight for the poly(alkylene oxide)-functionalized polysiloxane is 400 to 62,000. The most preferred poly(alkylene oxide)-functionalized polysiloxane are polyethylene-co-polypropylene-functionalized PDMS having the following structures:

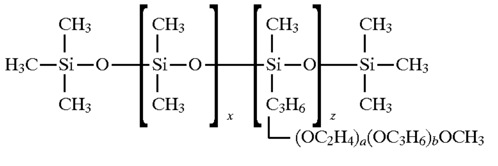

where x is 7 to 100, z is 1 to 3, a is 20 to 70, b is 10 to 40, or

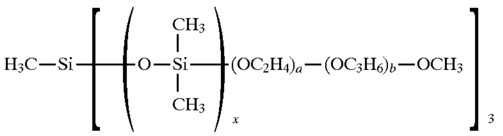

where x is 70 to 100, a is 20 to 70, and b is 10 to 40.

The poly(alkylene oxide)-functionalized polysiloxanes can be prepared, for example, by the grafting of polyalkylene oxides onto a linear polydimethylsiloxane through a hydrosilation reaction. This process results in an alkyl-pendant copolymer in which the polyalkylene oxide groups are attached along the siloxane backbone. Alternatively, polyalkylene oxides can be reacted with a branched polydimethyl siloxane through condensation chemistry creating an alkoxy-terminated siloxane copolymer. Additional description and preparation methods are disclosed in the literature and known to a person of ordinary skill in the art For example, see "Silicone Compounds Register and Review" Petrarch System, 1987, pp. 266–268, herein incorporated by reference.

The preferred release agents of this invention comprise poly(alkylene oxide)-functionalized polysiloxanes, non-poly(alkylene oxide)-functionalized polysiloxanes, preferably mercapto-functionalized polysiloxanes, and antioxidant. The antioxidants added to the release agents of this invention can be fluids or solids as long as the antioxidant can be blended and/or dispersed into the non-poly(alkylene oxide)-functionalized polysiloxane and poly(alkylene oxide)-functionalized polysiloxane. It is preferred that the antioxidant is a fluid at least at the operating temperature of the release agent.

The antioxidant preferably is a hydrogen-donating compound. Examples of useful antioxidants include hindered phenols, such as monophenolics, diphenolics, and polyphenolics, aromatic amines, such as alkylated phenylamines, hydroquinolines, dihydroquinones, diarylamines, hindered amines, divalent sulfur, such as thioethers, and trivalent phosphorus.

The preferred antioxidants are the hindered phenols including the monophenolics, diphenolics, and polyphenols. A hindered phenol preferably has a bulky alkyl in the ortho position of a phenol. The preferred hindered phenols are monophenols, particularly those having the following structure:

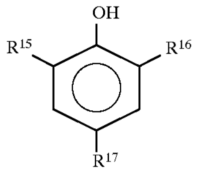

where $R^{15}$, $R^{16}$ and $R^{17}$ are independently alkyl groups, such as methyl, ethyl, propyl, isopropyl, butyl, tert-butyl, pentyl, hexyl, septyl, octyl, nonyl, decyl, and the like, and substituted alkyl groups, such as, thioalkyl, and alkylcinnamate groups. The alkyl groups and substituted alkyl groups preferably have less than 30 carbons.

It is preferred that $R^{15}$, and $R^{16}$ are independently alkyl groups or substituted alkyl groups having from 3 to 10 carbons, and $R^{17}$ is an alkyl group or substituted alkyl group having from 3 to 12 carbons. More preferably $R^{15}$, and $R^{16}$ are independently tert-butyl, methyl or (thiooctyl)methyl. More preferably, $R^{17}$ is methyl, (thiooctyl)methyl, or isooctylcinnamate.

The most preferred antioxidants are 2,6-di-tert-butyl-p-cresol; isooctyl 3,5-di-tert-butyl-4-hydroxyhydrocinnamate; and 2,4-bis [(octylthio)methyl]-o-cresol.

The antioxidants can be prepared by a person of ordinary skill in the art, or are commercially available. For example, 2,6-di-tert-butyl-p-cresol and other alkylated phenols can be made according to Stillson, U.S. Pat. No. 2,428,745; Kaminaka et al, U.S. Pat. No. 3,714,268; and Stames et al, U.S. Pat. No. 3,541,171, hereby all incorporated herein by reference. Additionally isooctyl 3,5-di-tert-butyl-4-hydroxyhydrocinnamate, and similar compounds can be prepared according to Dexter et al, U.S. Pat. No. 3,644,482; and Takee et al, U.S. Pat. No. 5,081,280, both hereby incorporated herein by reference.

Mixtures of compatible antioxidants can be used in the release agents on the fuser member of this invention.

The preferred release agents of the invention preferably comprise from 85% to 99.4% by weight non-poly(alkylene oxide)-functionalized poly(organosiloxane) fluid, from 0.5% to 5% by weight poly(alkylene oxide)-functionalized poly(organosiloxane), and from 0.1% to 10% by weight antioxidant, more preferably from 93% to 98.9% by weight of the non-poly(alkylene oxide)-functionalized poly (organosiloxane) fluid, from 1% to 2% by weight poly (alkylene oxide)-functionalized poly(organosiloxane), and from 0.1% to 5% by weight of antioxidant, most preferably the antioxidant is present from 0.1% to 1% by weight. The weight percentages are based on the total weight of the release agent. The most preferred non-poly(alkylene oxide) -functionalized poly(organosiloxane) fluid is mercapto-functionalized poly(organosiloxane).

To prepare the release agent, the non-poly(alkylene oxide) -functionalized poly(organosiloxane) fluid, poly(alkylene-oxide)-functionalized poly(organosiloxane) fluid and anti-oxidant are blended by a gentle stirring, with or without a mechanical stirrer. Preferably, it will not be necessary to heat or mill the mixture in order to obtain a smooth, uniform product. The viscosity of the release agent is preferably between 1 and 100,000 ctsk, more preferably, 50 to 60,000 ctsk at 25° C.

Additional information on the preferred release agents of this invention is disclosed by Chen et al, "Stable Release Agents", U.S. patent application Ser. No. 08/611,338, filed on Mar. 8,1996.

This invention will be better understood by reference to the examples which follow.

COMPARATIVE ROLLER 1 (CR-1)

EC-4952™ silicone supplied by Emerson Cummings, Inc. was coated on a roller core. EC-4952 is a silanol-terminated polymethylsiloxane having about 85 mole percent difunctional dimethylsiloxane repeating units, and about 15 mole percent trifunctional methylsiloxane repeating units, and a number-average molecular weight of about 21,000. EC-4952 has incorporated into its formulation aluminum oxide and iron oxide fillers.

A clean aluminum roller core was uniformly coated with a silicone primer GE 4044, commercially available from General Electric Co, air dried for 30 minutes and placed in a convection oven for 2 hours at 100° C. EC-4952 was blade-coated onto the roller, then cured for 24 hours at room temperature, and post-cured for 12 hours at 410° F. and 48 hours at 450° F. in a convection oven. The thickness of the EC4952 coating on the roller was 2.5 mm.

Roller 1 (1)

A roller made as described in Comparative Example 1 was additionally coated with 0.025 mm thick layer of Fluorel FX-9038™ available from 3M. Fluorel FX-9038™ is a terpolymer consisting of 52 mole percent of VF, 34 mole percent of TFE, and 14 mole percent HFP. The Fluorel FX-9038™ coating material was prepared by compounding 100 parts FX-9038, 3 parts of magnesium oxide and 6 parts of calcium hydroxide on a two-ball mill until a uniform blend was obtained. An 85:15 by weight mixture of methyl ethyl ketone (MEK) and methanol was added to the blend to make a 25% by weight solid solution and the solution was ball-milled until the solids were totally dissolved. After ballmilling 5 parts of amino-functionalized PDMS (PS-513 available form United Chemical Co.) was added to the solution. The roller made in Comparative Roller 1 was corona discharge treated for 15 minutes at 750 Watts, and then the fluoroelastomer solution was ring-coated onto the silicone rubber layer. The thickness of the Fluorel FX-9038™ layer was 0.025 mm.

COMPARATIVE ROLLER 2 (CR-2)

The preparation of Roller 1 was repeated except that Fluorel FX-2530™, available from 3M, was used instead of Fluorel FX-9038™. Fluorel FX-2530™ is a copolymer consisting of 63 mole percent VF, 37 mole percent HFP.

COMPARATIVE ROLLER 3 (CR-3)

The preparation of Roller 1 was repeated except that 50 parts of Vydex™ AR/IPA commercially available from DuPont was added to the FX-9038™, coating composition prior to ball-milling the first time, and the solvent was MEK alone. Vydex™ AR/IPA is waxy particles of polytetrafluoroethylene.

COMPARATIVE ROLLER 4 (CR-4)

The preparation of Comparative Roller 3 was repeated except that 100 parts of Vydex AR/IPA was used in the composition.

COMPARATIVE ROLLER 5 (CR-5)

A roller made as described in Comparative Example 1 was coated with 0.025 mm thick layer of an interpenetrating network of separately crosslinked silicone and fluoroelastomer polymers. The interpenetrating network was prepared by compounding 20 parts SRF-100, silicone fluid marketed by General Electric and 100 parts Fluorel FX-9038, 3 parts of magnesium oxide and 6 parts of calcium hydroxide on a two-ball mill until a uniform blend was obtained. A coating solution was prepared and a roller was coated as described for Roller 1.

Release Agent A

A release agent consisting of polydimethylsiloxane fluid having a viscosity of 60,000 ctsk at 25° C., DC-200, commercially available from Dow Corning.

Release Agent B

A release agent consisting of polydimethylsiloxane fluid having a viscosity of 350 ctsk, DC-200, commercially available from Dow Corning.

Release Agent C

A release agent consisting of a blend of polydimethylsiloxane fluid having a viscosity of 350 ctsk at 25° C., 2 percent by weight poly(alkylene oxide)-functionalized poly (organosiloxane), Silwet™ L7002, commercially available from Union Carbide, and 0.1 percent by weight 2,4-bis[ (octylthio)methyl]-o-cresol, Irganox™ 1520 available from Ciba-Geigy.

Release Agent D

A release agent consisting of mercapto-functionalized polydimethylsiloxane fluid having a viscosity of 270 ctsk at 25° C. available from Xerox as 5090 fuser oil.

Release Agent E

A release agent consisting of a blend of mercapto-functionalized polydimethylsiloxane fluid having a viscosity of 270 ctsk at 25° C. available from Xerox as 5090 fuser oil, and 2 percent by weight poly(alkylene oxide)-functionalized poly(organosiloxane), Silwet™ L7002, commercially available from Union Carbide, and 0.1 percent by weight 2,4-bis[(octylthio)methyl]-o-cresol, Irganox™ 1520 available from Ciba-Geigy.

Testing Conditions

Each of the rollers was tested by substituting the rollers for the fuser roller in an EK1575 electrophotographic machine commercially available from the Eastman Kodak Co. The release agent indicated in Table 1 was applied at a rate of 0.5 mg/copy. The fuser roller temperature was 380° F.

The toner bearing document consisted of 20 lb paper having half inch wide toner bars consisting of toner particles at a density of 1.09 to 1.5 mg/$cm^2$ toner, alternating with half inch wide bars with no toner present.

Pad Contamination

Nomex pads (0.5 by 1.0 inch) were installed across the length of the fuser roller. Toner offset was collected from the fuser roller by the nomex pads. The pads were removed and replaced every 5,000 copies for a total of 40,000 copies. The reflection densities were measured on the removed pads and the average of the measurements for each roller is reported in Table 1. The lower the average reflection density indicates the lower toner offset. An X-Rite 338 Photographic Densitometer was used to measure the reflection density.

Release Density

For each of the 5,000 copies for the total of 40,000 copies made above, the maximum toner release density for each of the fuser rollers was determined by passing papers covered with at first low density amounts of toner and then increasing the density of toner on the paper until toner offset onto the fuser member was observed. No release agent was applied to the rollers during this test. The highest density of toner on the paper without offset for each roller every 5,000 copies was recorded and the average is reported in Table 1. The higher the density of the toner on the paper without offset indicates a roller having better release.

Wick Contamination

The reflection density of the release oil wick was also measured after 40,000 copies to determine the amount of toner contamination of the wick due to toner offset from the fuser roller. The result for each roller is recorded in Table 1. The lower the average reflection density indicates lower toner offset and contamination of the wick.

TABLE 1

| Roller | Release Agent | Pad Contamination | Release Density | Wick Contamination |
|---|---|---|---|---|
| CR-1 | A | 0.75 | 9.0 | 0.65 |
| 1 | A | 0.93 | 9.8 | 0.95 |
| 1 | B | 0.84 | 9.7 | 0.70 |
| 1 | C | 0.80 | 12.5 | 0.60 |
| 1 | D | 0.74 | 11.5 | 0.52 |
| 1 | E | 0.68 | 14.5 | 0.46 |
| CR-3 | A | 0.70 | 8.5 | — |
| CR-4 | A | 1.15 | 8.9 | 0.98 |
| CR-5 | none | 1.27* | 5.4 | — |

*Measured after only 1,100 copies were made without the application of release agent.

The rollers were tested in additional off-line tests as described below.

Wear Test

The wear rate test of coatings on a stainless steel sheet was performed using a commercially available Norman Abrader Device. For this test, the abrader device was modified by replacing the standard grommet wheel with an aluminum rod, placing a renewable paper strip on the samples and running the tests at about 175° C. After 1,600 cycles, the step, which is the height of the indentation in the sheet, was measured. This is the result that is reported in table 2.

Offset Test

The method of screening formulations for toner off-set phenomenon is described as follows. A piece of roller material is in static contact with a piece of paper with 100 percent toner (HX Toner, available from Eastman Kodak Company) laydown under a pressure of 80 psi (551.6 kPa) at a fusion temperature of 170° C. A nip area is formed on the roller material during the contact. The piece of paper is peeled off from the roller material after various lengths of contact time, and the nip area on the roller material is examined under an optical microscope. The contact time can be translated into number of copies through machine nip dwell time. The maximum time for the tests reported in the table was 20 minutes.

The longer the contact time needed to develop toner offset in the nip area in this offline test, the greater the number of copies a roller can handle before it shows toner off-set in a machine.

Oil Swell

Oil swell is defined as the percent weight gain due to imbibed oil. A 2.5 mm slab is suspended by wire in test tubes containing 10 grams of 350 centistoke PDMS oil. The samples were incubated at 175° C. for seven days. No percentage weight gain is indicated by “no” in Table 2. “Yes” indicates a percentage weight gain.

TABLE 2

| Roller | Wear (mm) | Toner Offset | Oil Swell |
|---|---|---|---|
| 1 | 0.005 | 20 minute no offset | No |
| CR-1 | 0.0950 | 1 minute offset | Yes |
| CR-2 | 0.005 | 1 minute offset | No |
| CR-3 | 0.02 | 20 minute no offset | No |
| CR-4 | 0.03 | 20 minute no offset | No |
| CR-5 | 0.0075 | 20 minute offset | No |

The examples indicate that the fuser members of this invention have the best combination of wear resistance, non-oil swell, and toner release properties.

This invention has been described with particular reference to preferred embodiments thereof, but it is understood that modifications can be made within the spirit and scope of the invention.

We claim:

1. A fuser member comprising:

a support;

a fluoroelastomer layer comprising a fluoroelastomer of from 42 to 58 mole percent vinylidene fluoride, 26 to 44 mole percent tetrafluoroethylene, and 5 to 22 mole percent hexafluoropropylene;

and release agent on said fluoroelastomer layer; said release agent comprising a non(alkylene oxide)-functionalized poly(organosiloxane) fluid, a poly (alkylene oxide)-functionalized poly(organosiloxane) fluid, and an antioxidant.

2. The fuser member of claim 1 wherein said non-poly (alkylene oxide)-functionalized poly(organosiloxane) fluid comprises a mercapto-functionalized poly(organosiloxane).

* * * * *